United States Patent [19]

Adachi

[11] Patent Number: 4,682,241

[45] Date of Patent: Jul. 21, 1987

[54] DATA TRANSFER SYSTEM

[75] Inventor: Eiichi Adachi, Tokyo, Japan

[73] Assignee: Ricoh Company Ltd., Tokyo, Japan

[21] Appl. No.: 736,842

[22] Filed: May 22, 1985

[30] Foreign Application Priority Data

May 28, 1984 [JP] Japan ............................... 59-108030

[51] Int. Cl.$^4$ ............................................. H04N 1/419
[52] U.S. Cl. .................................... 358/261; 358/288
[58] Field of Search .............. 358/261, 288, 256, 257, 358/280

[56] References Cited

U.S. PATENT DOCUMENTS

| | | | |
|---|---|---|---|
| 3,813,485 | 5/1974 | Arps | 358/261 |
| 4,409,622 | 10/1983 | Watanabe | 358/288 |
| 4,533,956 | 8/1985 | Fedde | 358/261 |
| 4,543,611 | 9/1985 | Kurahayashi | 358/288 |
| 4,549,221 | 10/1985 | Yamamoto | 358/288 |
| 4,571,634 | 2/1986 | Caneschi | 358/261 |

*Primary Examiner*—Howard W. Britton
*Attorney, Agent, or Firm*—Oblon, Fisher, Spivak, McClelland & Maier

[57] ABSTRACT

A data transfer system comprising first means operative to successively produce pieces of information each consisting of a limited number of data bits, the pieces of information including those having a predetermined nature, second means responsive to the pieces of information produced by the first means and operative to discriminate pieces of information having the predetermined nature from other pieces of information, third means for counting the pieces of information having the predetermined nature when such pieces of information occur successively, and fourth means responsive to encode the successively occurring pieces of information having the predetermined nature into a single piece of information including a code indicating the predetermined nature and a code indicating the number of the successively occurring pieces of information having the predetermined nature. The system may find typical application in a facsimile equipment.

3 Claims, 3 Drawing Figures

FIG. 3

(A) | EOL | L1 DATA | EOL | L2 DATA | EOL | L3 DATA |

*PRIOR ART*

(B) | EOL | TAG | L1 DATA | EOL | TAG | L2 DATA | EOL | TAG | L3 DATA | EOL |

*PRIOR ART*

(C) | EOL | MB | L1 DATA | EOL | MB | NO. OF SUC'VE LINES | EOL | MB | Ln DATA |

(D) | EOL | TAG | MB | L1 DATA | EOL | TAG | MB | NO. OF SUC'VE LINES | EOL | TAG | MB | Ln DATA |

DATA TRANSFER SYSTEM

FIELD OF THE INVENTION

The present invention relates to a data transfer system having a common bus providing bidirectional communication between various circuit components including a microprocessor unit.

BACKGROUND OF THE INVENTION

An example of data transfer systems presently in use is the data transfer system of a facsimile equipment. The data transfer system of a facsimile uses a common bus through which graphic information is transferred between various circuit components of the system including a central processor unit. In such a data transfer system, it has been an ordinary practice to transfer graphic information on the common bus for each of the lines scanned from a subject copy or each of the lines to be reproduced. When white lines occur successively, the graphic information is encoded faster than graphic information is to be coded in other conditions and, for this reason, a large quantity of graphic information must be transferred through the common bus for a relatively short period of time. The larger the proportion of the share of the graphic information signals which occupy the common bus, the smaller the proportion of the share of the central processing unit which is allowed to use the common bus. This results in significant reduction in the data transfer efficiency of the common bus.

Where the data transfer system is arranged so that some lines are to be skipped over as implemented in the data transfer systems of some facsimile equipments, the number of the lines to be skipped is expressed by a sequence of a predetermined number of bits. To provide matching between the readout or record rate and the data transfer rate, some invalid bits are usually added to the sequence of these bits when coded data is to be transferred on the common bus. When a relatively small number of lines are to be skipped over, an increased number of invalid bits are added to the sequence of the bits expressing the number of the lines to be skipped. When an increased number of lines are to be skipped, on the other hand, the sequence of the bits to express the number of the lines is broken down to two or more component sequences each containing invalid bits. A considerably large number of invalid bits must be in any event contained in the bits to be transferred on the common bus even though the data is to be transferred in a compressed state. This is also responsible for the reduced data transfer efficiency of the common bus.

SUMMARY OF THE INVENTION

It is, accordingly, a prime object of the present invention to provide an improved data transfer system in which successively occurring pieces of information having a nature common to them are detected from among the pieces of information produced and are encoded into a single piece of information including a code representative of the particular nature of the information and the number of the successively occurring pieces of information having the common nature. The successively occurring pieces of information having the common nature are thus skipped over when transferred through the common bus of the system so that the burden imposed on the bus can be alleviated and accordingly the data transfer efficiency of the common bus can be increased even drastically.

In accordance with one outstanding aspect of the present invention, there is provided a data transfer system comprising first means operative to successively produce pieces of information each consisting of a limited number of data bits, the pieces of information including those having a predetermined nature, second means responsive to the pieces of information produced by the first means and operative to discriminate pieces of information having the predetermined nature from other pieces of information, third means for counting the pieces of information having the predetermined nature when such pieces of information occur successively, and fourth means responsive to encode the successively occurring pieces of information having the predetermined nature into a single piece of information including a code indicating the predetermined nature and a code indicating the number of the successively occurring pieces of information having the predetermined nature.

In accordance with another outstanding aspect of the present invention, there is provided a data transfer system comprising first means operative to successively produce pieces of information each consisting of a limited number of data bits, the pieces of information indicating lines of different colors including a predetermined color, second means responsive to the pieces of information produced by the first means and operative to discriminate pieces of information indicating lines of the predetermined color from other pieces of information, third means for counting the pieces of information indicating lines of the predetermined color when such pieces of information occur successively, and fourth means responsive to encode the successively occurring pieces of information indicating lines of the predetermined color into a single piece of information including a code specifying the predetermined color and a code specifying the number of the successively occurring pieces of information indicating lines of the predetermined color. In this instance, the code indicating the number of the pieces of information indicating lines of the predetermined color is expressed preferably in the form of a runlength code (RL) indicating the number of, for example, successively occurring white lines.

BRIEF DESCRIPTION OF THE DRAWINGS

The features and advantages of a data transfer system according to the present invention will be more clearly appreciated from the following description taken in conjunction with the accompanying drawings in which:

FIG. 3 shows examples of coding formats used in the data transfer systems of prior-art facsimile equipments (A and B) and preferred examples of coding formats which may be used in the data transfer system embodying the present invention (C and D).

DESCRIPTION OF THE PREFERRED EMBODIMENT

Figure 1:
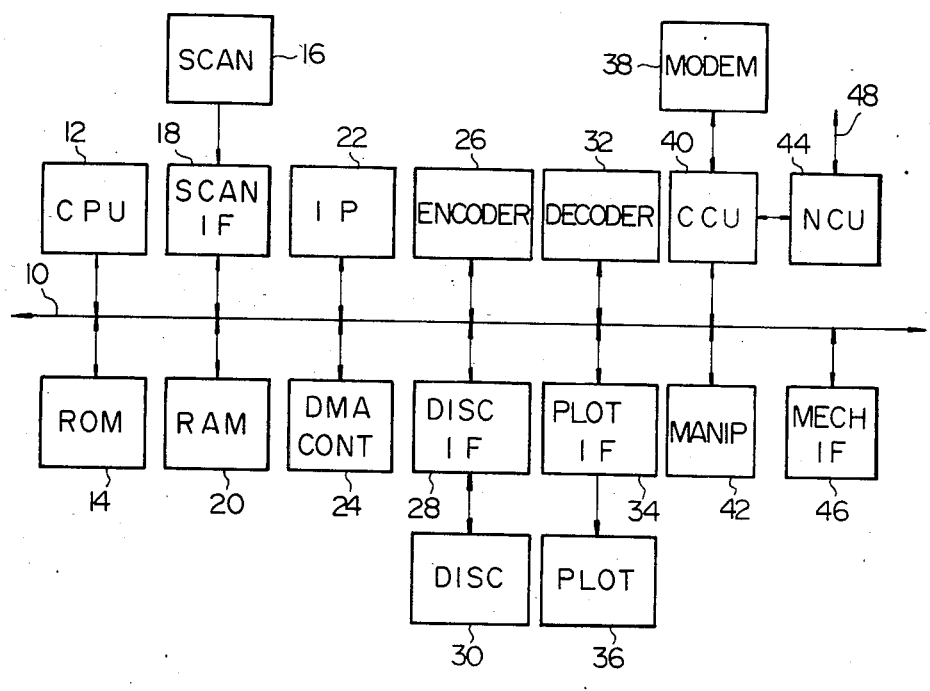
FIG. 1 is a block diagram showing a data transfer system embodying the present invention.

In FIG. 1 of the drawings, a data transfer system embodying the present invention is shown which is assumed to be the data transfer system of a facsimile. The present invention will thus be hereinafter described as being applied to the data transfer system of a facsimile equipment but it should be borne in mind that this is merely for the purpose of description and that the gist of the present invention is applicable to any form of data transfer systems.

The data transfer system shown in FIG. 1 has a common bus 10 of, for example, an eight-bit or sixteen-bit width providing a direct memory access (DMA) channel. The common bus 10 permits bidirectional communication between various circuit components of the data transfer system which include, as shown, a central processing unit 12 (CPU), a read-only memory 14 (ROM), an image scanner 16 labelled as "SCAN", a scanner interface unit 18 labelled as "SCAN IF", a random access memory 20 (RAM), an image processor 22 labelled as "IP", a direct-memory-access controller 24 labelled as "DMA CONT", an encoder 26, a disc interface unit 28 labelled as "DISC IF", an information record disc 30, a decoder 32, a plotter interface unit 34 labelled as "PLOT IF", a plotter 36 labelled as "PLOT", a modulator/demodulator unit 38 (MODEM), a communications control unit 40 labelled as "CCU", a manipulation board 42 labelled as "MANIP", a network control unit 44 labelled as "NCU", and a mechanical interface unit 46 labelled as "MECH IF". The image scanner 18 is essentially an optoelectrical transducer operative to optically pick up graphic information from an information record medium (not shown) and to convert the information thus read into a series of electric binary signals. The scanner 18 operates under the control of the CPU 12 through the common bus 10. The record medium, which may be a manuscript or a document, will be hereinafter referred to as a subject copy which carries graphic information in the form of letters, signs and/or patterns. The electric signals thus produced by the image scanner 18 are formulated by the scanner interface unit 18 into the forms of graphic information signals operable on the common bus 10. On the other hand, the image processor 22 has functions to magnify or reduce the images to be reproduced and change the resolution of the images to be reproduced. The DMA controller 24 is adapted to control the transmission of graphic and coded information through the common bus 10 in a DMA mode. The information record disc 30 is a magnetic record medium which has a collection of information magnetically stored therein or which is used to magnetically store therein the coded information received through the disc interface unit 28. The decoder 11 is operative to decode the received coded information into graphic information signals appropriate for facsimile reproduction. The plotter 13 is a printing head of, for example, the dot type and is adapted to print the images represented by the graphic information signals supplied through the plotter interface unit 34. The network control unit 44 is connected to an external communication line 48 such as, for example, a telephone line. All the component modules as above described, except for the network control unit 44, are directly connected to the common bus 10 through bidirectional paths as shown.

Operation of the data transfer system thus constructed and arranged will now be described in respect of (1) a read-and-transmit mode, (2) a receive-and-reproduce mode, (3) a stored-data transmission mode and (4) a receive-and-store mode.

(1) Read-and-Transmit Mode

During this data transmission mode of operation of the system shown in FIG. 1, data originates in the image scanner 16 and flows to the external communication line 48 through the scanner interface unit 18, RAM 20, encoder 26, communications control unit 40, modem 38, communication control unit 40 and network control unit 44 in this sequence. Thus, the image scanner 18 optically picks up graphic information representative of, for example, various black and white patterns from a subject copy and converts the information into a series of binary signals. The digital signals thus produced by the image scanner 18 are transformed into "raw" graphic information signals operable for transmission on the common bus 10 by means of the scanner interface unit 18. The resultant graphic information signals are loaded into the RAM 20 through the common bus 10. The raw graphic information signals thus stored in the RAM 20 are supplied via the common bus 10 to the encoder 26 and are thereby processed into, for example, eight-bit or sixteen-bit coded digital signals. The parallel coded signals produced from the encoder 26 are fed also by way of the common bus 10 to the communication control unit 40 and are thereby transformed into a succession of bits. The series of digital signals is then supplied to the modem 38 for modulation typically into an a.c. signal adapted for transmission on the external communication line 48. The a.c. signal produced by the modem 38 is passed through the communication control unit 40 and the network control unit 44 to the external communication line 48 for transmission to an external receiver terminal (not shown). During the read-and-transmit mode of operation of the data transfer system, the image scanner 16 and the scanner interface unit 18 thus constitute input means and the external communication line 48 serves as output means of the system.

(2) Receive-and-Reproduce Mode

During this data reception mode of operation of the data transfer system embodying the present invention, data is supplied from an external transmitter terminal (not shown) and is transmitted through the external communication line 48 to the plotter 36 for reproduction in the system. In this instance, the data received on the external communication line 48 flows to the plotter 36 through the network control unit 44, communication control unit 40, modem 38, communication control unit 40, decoder 32, RAM 20 and plotter interface unit 34 in this sequence. Thus, the a.c. signal received from the transmitter terminal through the external communication line 48 is supplied by way of the network control unit 44 and the communication control unit 40 to the modem 38 and is thereby demodulated into a series of digital signals. The serial digital signals produced from the modem 38 are fed back to the communication control unit 40 and are transformed into parallel eight-bit or sixteen-bit signals representative of the coded graphic information originating in the transmitter terminal. The coded signals are passed on the common bus 10 to the decoder 32 and are decoded into graphic information signals similar to the original raw graphic information signals transmitted from the transmitter terminal. These digital graphic information signals are loaded into the RAM 20 via the common bus 10 and are supplied from the RAM 20 to the plotter interface unit 34 also by way of the common bus 10. In response to the graphic information signals thus supplied through the plotter interface unit 34, the plotter 36 reproduces the graphic information in the form of letters, signs and/or patterns. During this receive-and-reproduce mode of operation of the data transfer system, the external communication line 48 thus serves as output means and the plotter 36 and the plotter interface unit 34 constitute input means of the system.

(3) Stored-Data Transmission Mode

During the stored-data transmission mode of operation of the system shown in FIG. 1, data originates in the information record disc 30 into which which has graphic information preliminarily stored in the form of coded binary signals representative of, for example, various black and white patterns of, for example, letters, signs and/or graphic patterns. The data read from the disc 30 flows to the external communication line 48 through the disc interface unit 28, RAM 20, decoder 32, RAM 20, image processor 22, RAM 20, encoder 26, communications control unit 40, modem 38, communication control unit 40 and network control unit 44 in this sequence. Thus, the binary coded graphic information read from the disc 30 are transformed into signals operable for transmission on the common bus 10 by means of the disc interface unit 28. The resultant coded graphic information signals are supplied to and stored into the RAM 20 through the common bus 10. The graphic information signals thus stored in the RAM 20 are supplied also via the common bus 10 to the decoder 32 and are decoded into "raw" graphic information signals. These decoded graphic information signals are supplied to the RAM 20 for storage therein by way of the common bus 10 and are thereafter fed from the RAM 20 to the image processor 22 also through the common bus 10. In this image processor 22, the raw graphic information signals may be modified to magnify or reduce the images to be reproduced (as from the standardized A4 to A3 sizes or vice versa) and/or to change the line density of the images to be printed (as from 8×7.7 lines/mm to 8×3.85 lines/mm or vice versa) as desired. The graphic information signals which may thus be modified by the image processor 22 are stored in the RAM 20 via the common bus 10 and are transferred from the RAM 20 to the encoder 26 for being processed into digital signals coded in accordance with the coding format used on the external receiver terminal (not shown) to which the data is to be sent out. The coded digital signals produced from the encoder 26 are fed also by way of the common bus 10 to the communication control unit 40 and are thereby transformed into a succession of digital signals. As in the case of the read-and-transmit mode of operation, the series of digital signals is then supplied to the modem 38 for modulation into an a.c. signal adapted for transmission on the external communication line 48. The a.c. signal produced by the modem 38 is passed through the communication control unit 40 and the network control unit 44 to the external communication line 48 for transmission to the receiver terminal (not shown). During this stored-data transmission mode of operation, the information record disc 30 and the disc interface unit 28 thus constitute input means and the external communication line 48 serves as output means of the system.

(4) Receive-and-Store Mode

During the receive-and-store mode of operation of the data transfer system embodying the present invention, data is supplied from an external transmitter terminal (not shown) through the external communication line 48 and is magnetically stored in the information record disc 30 of the data transfer system shown in FIG. 1. In this instance, the data received on the external communication line 48 flows to the disc 30 through the network control unit 44, communication control unit 40, modem 38, communication control unit 40, decoder 32, RAM 20, encoder 26, RAM 20, and disc interface unit 28 in this sequence. Thus, the a.c. signal transmitted from the transmitter terminal through the external communication line 48 is first supplied by way of the network control unit 44 and the communication control unit 40 to the modem 38 and is thereby demodulated into a series of digital signals. The serial digital signals produced from the modem 38 are fed back to the communication control unit 40 and are transformed into parallel digital signals representative of the coded graphic information signals originating in the transmitter terminal. The coded signals are passed on the common bus 10 to the decoder 32 and are decoded into graphic information signals similar to the original raw graphic information signals produced at the transmitter terminal. These digital graphic information signals are loaded into the RAM 20 via the common bus 10 and are supplied from the RAM 20 to the encoder 26 for being coded in accordance with the coding format used in the shown system. The coded graphic information signals are loaded into the RAM 20 through the common bus 10 and are supplied from the RAM 20 to the disc interface unit 28 also by way of the common bus 10 for storage into the disc 30. During this receive-and-store mode of operation of the data transfer system, the external communication line 48 thus serves as output means and the disc 30 and the disc interface unit 28 constitute input means of the system.

Consideration will now be given as to the performance efficiency at which raw, viz., uncoded graphic information signals are to be transferred through the common bus 10 on a DMA basis. For this purpose, analysis will first be made into the quantity of the bits which are required to be transmitted on the common bus 10 during each of the four data transmission and reception modes as above described. By way of example, it is herein assumed that the resolution of the images to be 3 reproduced is selected at 8×7.7/mm (with 7.7 lines per mm) and the coverage of each of the pages on which the images are to be reproduced is selected at 1728 bits/line ×297 mm (A4 size).

(1) Read-and-transmit mode:

The number of the bits to be transmitted on the common bus 10 during this transmission mode each time the common bus 10 is occupied is:

$$1728 \times 297 \times 7.7 \approx 4 \text{ megabits/page}.$$

Since the common bus 10 is occupied twice by the raw graphic information signals (from the scanner interface unit 18 to the RAM 20 and from the RAM 20 to the encoder 64), the total number of bits per page is given approximately as $$4 \text{ megabits/page} \times 2 = 8 \text{ megabits/page}.$$

$$= 1 \text{ megabyte/page}.$$

(2) Receive-and-reproduce mode:

The number of the bits to be transmitted on the common bus 10 during this data reception mode each time the common bus 10 is occupied is equal to that in the read-and-reproduce mode. The common bus 10 is occupied twice by the raw graphic information signals (from the decoder 32 to the RAM 20 and from the RAM 20 to the plotter interface unit 34), the total number of bits per page is also given approximately as 1 megabyte/page.

(3) Stored-data transmission mode:

The number of the bits to be transmitted on the common bus 10 during this data transmission mode each time the common bus 10 is occupied is also approximately 4 megabits per page. The common bus 10 is occupied four times by the raw graphic information signals (from the decoder 32 to the RAM 20, from the RAM 20 to the image processor 56, from the image processor 56 to the RAM 20 and from the RAM 20 to the encoder 64), the total number of bits per page is given approximately as:

$$4 \text{ megabits/page} \times 4 \approx 16 \text{ megabits/page}$$
$$= 2 \text{ megabytes/page}.$$

(4) Receive-and-store mode:

The number of the bits to be transmitted on the common bus 10 during this data reception mode each time the common bus 10 is occupied is also approximately 4 megabits per page. The common bus 10 is occupied twice by the raw graphic information signals (from the decoder 32 to the RAM 20 and from the RAM 20 to the disc interface unit 28), the total number of bits per page is also given approximately as 1 megabyte/page.

On the basis of these results, the periods of time for which the common bus 10 is to be occupied by the graphic information signals for each of the four different modes of operation when the signals are transmitted at the transfer rate of 1 megabyte per second on a DMA basis.

(1) Read-and-transmit mode:

$$(1 \text{ megabytes/page})/(1 \text{ megabytes/sec})$$
$$= 1 \text{ sec/page}.$$

(2) Receive-and-reproduce mode:

$$(1 \text{ megabytes/page})/(1 \text{ megabytes/sec})$$
$$= 1 \text{ sec/page}.$$

(3) Stored-data transmission mode:

$$(2 \text{ megabytes/page})/(1 \text{ megabytes/sec})$$
$$= 2 \text{ sec/page}.$$

(4) Receive-and-store mode:

$$(1 \text{ megabytes/page})/(1 \text{ megabytes/sec})$$
$$= 1 \text{ sec/page}.$$

In the meantime, it is desirable that all the steps for the operation in each of the four modes be completed within the period of time for which the scanner 16 is in operation for reading information from a subject copy. The scanner 16 may be temporarily brought to a stop to permit the common bus 10 to be used for the transmission of data for any of the four modes of operation. This will however compel the operator to wait for a longer time and is practically not acceptable. When the scanner 16 is operated at the maximum scanning rate thereof, the higher the maximum scanning rate the larger would the share of the graphic information signals which occupy the common bus 10 for each of the four modes of operation to the scanner readout time be. The following table shows the proportions of such shares in percentage of the periods of time for which the common bus 10 is to be occupied by the graphic information signals during each of the four modes of operation.

From this table it will be seen that, the higher the scanning rate of the scanner 18 in the system shown in FIG. 1, the larger the proportion of the share of the graphic information signals which use the common bus 10 and accordingly the smaller the proportion of the share of the CPU 12 which is permitted to use the common bus 10.

| Mode of Operation | Bus Occupation Time | Scanner Readout Time (A4) | |
|---|---|---|---|
| | | 6 sec/page | 3 sec/page |
| Read-and-transmit | 1 sec/page | 17% | 33% |
| Receive-and-reproduce | 1 sec/page | 17% | 33% |
| Stored-data-transmission | 2 sec/page | 33% | 67% |
| Receive-and-store | 1 sec/page | 17% | 33% |

The present invention contemplates drastically increasing the efficiency at which graphic information signals are to be transmitted on the common bus 10 in a data transfer system exemplified by the system shown in FIG. 1. To achieve such an end, the present invention makes use of the fact that a white or generally blank area of a subject copy usually accounts for most of the total area of the copy and that while or blank lines are most likely appear successively. Thus, the present invention proposes to indicate in a data transfer system that the lines currently scanned in succession are white lines and that there is a such-and-such number of such lines scanned by now, rather than transmitting the graphic information for each of the white lines successively scanned.

In a data transfer system according to the present invention, the maximum data transmission rate is achieved when a subject copy has white lines throughout its area. If, in this instance, the information to indicate white lines is given in the form of eight bits and the number of the white lines which have been detected successively is represented by sixteen bits, then only a total of twenty four bits are necessary for the transmission of the graphic information for a totally white subject copy. In the case of a subject copy of the standardized A4 size, the number of bits required for the transmission of the graphic information indicating that the lines on the subject copy are all white lines can thus be reduced from 1 or 2 megabytes in the conventional system to only 3 bytes in a system according to the present invention.

To implement the basic concept of the present invention in the system shown in FIG. 1, the scanner interface unit 18, RAM 20, encoder 64 and plotter interface unit 34 are improved to have the following additional capabilities.

Scanner Interface Unit 18

The scanner interface unit 18 has additional functions to determine that a signal received the scanner 16 is indicative of a white line and to inhibit the signal from being passed to the common bus 10. The scanner interface unit 18 has further additional functions to count signals indicative of white lines, to recognize that white lines are being detected in succession and to produce a white-line signal representative of the number of counts of the successive white lines.

Plotter interface unit 34

The plotter interface unit 34 is responsive to the white-line signal from the scanner interface unit 18 and has additional functions to indicate to the plotter 36 the number of the successive white lines represented by the white-line signal received.

RAM 20

Figure 2:
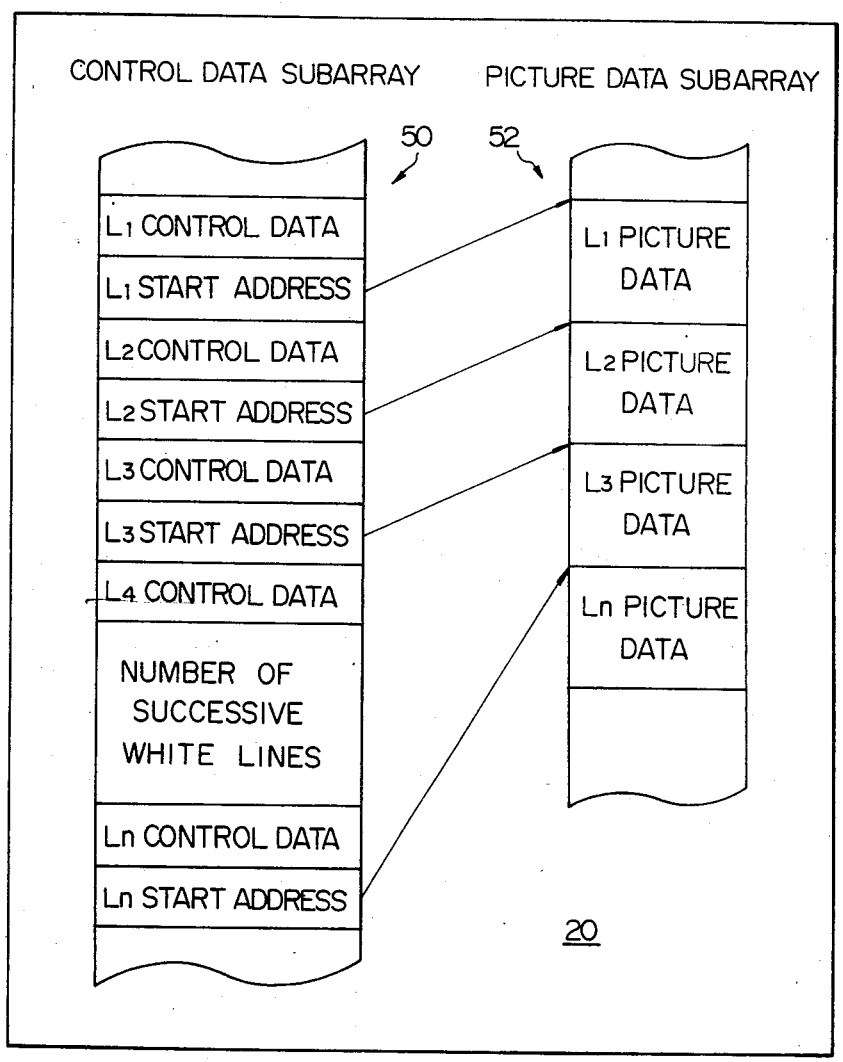
FIG. 2 is a memory map showing the contents of the random access memory included in the data transfer system illustrated in FIG. 1.

The RAM 20 has a memory area assigned to graphic information and consisting of a subarray to contain graphic control data and a subarray to contain picture data. FIG. 2 shows examples of the memory maps of these two subarrays, wherein the subarray to contain graphic control data is indicated at 50 and the subarray to contain picture data is indicated at 52. In FIG. 2, it is assumed by way of example that first three successive lines $L_1$ to $L_3$ scanned by the scanner 18 consist of black or alternately white and black lines, the subsequent successive lines $L_4$ to $L_{n-1}$ consist of white lines, and the last or nth number of line is a black line. Thus, the graphic control data for each of the first three lines $L_1$ to $L_3$ and the starting address for each of these lines $L_1$ to $L_3$ are successively stored in the graphic control data storage subarray 50, as the lines $L_1$ to $L_3$ are detected by the scanner 18. Concurrently, the picture data for each of the three lines $L_1$ to $L_3$ are successively stored in the picture data storage subarray 52 at the addresses starting with each of the starting addresses memorized in the subarray 50, each time the line $L_1$, $L_2$ or $L_3$ is detected by the scanner 18. In response to the white lines $L_4$ to $L_{n-1}$ successively detected by the scanner 18, signals indicating that the successive lines being currently scanned are all white lines and that the number of the successive white lines is $n-4$ are stored in the graphic control data subarray 50. In this instance, there is no picture data loaded into the picture data subarray 52 as will be seen from FIG. 2. If the information indicating the number of successively occurring white lines is given in the form of sixteen bits as above noted, a maximum of 64K-1 lines can be represented by the graphic control data to be stored in the subarray 50. When the nth number of line which is assumed to be a black line is scanned, the graphic control data and picture data for the particular line $L_n$ are stored in the subarrays 50 and 52, respectively, in response to the line $L_n$ detected by the scanner 18. The graphic control data to be stored in the subarray 50 in response to, for example, the third line $L_3$ or the nth number of line $L_n$ may contain information indicating that the particular line is a black line (or a line of any other color if used).

Encoder 64

FIG. 3 shows some examples of coding formats which may be used on the encoder 64. The coding format shown in sections (A) and (B) are conventional two-dimensional (MH) and three-dimensional (MR) coding formats, respectively, which comply with CCITT T 44, while the coding format indicated in sections (C) and (D) are two-dimensional (MH) and three-dimensional (MR) coding formats, respectively, which are used for the encoder 64 in accordance with the present invention. The MH coding format shown in section (A) includes a succession of code groups respectively allocated to the scanning lines $L_1$, $L_2$, $L_3$, ... $L_n$, and these code groups consist of bits 54 indicating synchronizing codes (EOL), and bits 56 representative of coding data 56 for the individual lines $L_1$ to $L_n$. The MR coding format shown in section (B) includes tag or identification bits 58 (TAG) for identifying lines to be two-dimensionally coded from lines to be three-dimensionally coded, in addition to the synchronizing codes EOL and the coding data 6. On the other hand, the MH coding format shown in section (C) of FIG. 3 includes not only the synchronizing codes EOL and the coding data 56 as in the coding format of section (A) but also mode bits 60 (MB) for discriminating successively occurring white lines from other lines and bits 62 indicating the number of the successively occurring white lines, bits 64 representative of the coding data for the nth number of line $L_n$. The MR coding format shown in section (D) of FIG. 3 includes the tag or identification bits 58 in addition to the bits included in the coding format of section (C).

If it is assumed that the K value as defined in CCITT T44 is determined to be infinite and that 600 lines are found to have successively occurred in white, then a total of $600 \times (12 + 1 + 1) = 8400$ bits or, if the bits for the synchronizing codes EOL were dispensed with, $600 \times (1 + 1) = 1200$ bits are necessary to have the lines coded in accordance with the conventional three-dimensional coding format shown in section (B) of FIG. 3. As will be seen from comparison between the coding formats shown in sections (A) and (B) and the coding formats shown in sections (C) and (D), the latter formats are characterized by the insertion of one or more mode bits MB between each of the synchronizing code EOL and the immediately subsequent coding data 56 for each of the lines which occur in black or in alternately black and white. By the use of such additional bits, a particular line can be known that the line is either a black line or a white line subsequent to a black line, viz., not a white line subsequent to a white line. The mode bit, if implemented in the form of a single bit, may be set to be logic "1" if the line to which the mode bit corresponds is either a black line or a white line subsequent to a black line and logic "0" if the line is a white line subsequent to a white line. When the mode bit of the logic "1" status appears in response to a particular line, a runlength (RL) code is used as the bits 62 to indicate the number of the successively occurring white lines. As the runlength code to be used for this purpose may be the white runlength code indicating the length of successively occurring white lines. The coding data 62 to indicate the occurrence of successive 600 white lines may be expressed in the form of a sixteen-bit sequence of "1011010000101000" and follows the mode bit MB of the logic "1" status. The encoder 64 skips over these 600 lines in response to this sixteen-bit coding data 62 until another mode bit MB of logic "0" appears. The runlength code herein used is preferably the code which conforms to MH Table for Class G3 facsimile of CCITT codes. The runlength code used for the encoder 64 in accordance with the present invention thus consists of the first bit used as the mode bit MB, the subsequent eight bits used for a makeup code (MC), and the remaining seven bits used for a termination code (TC). If it is assumed that the subject copy under consideration has a total of 1200 lines including additional 600 lines which do not occur successively in white, then a mode bit of logic "0" state is necessary for each of these additional 600 lines so that the bits required for the coding of the 1200 lines total up to 16+600×1=616 bits. In accordance with with the present invention, the number of bits required for the coding of 1200 lines consisting of 600 successive white lines plus 600 otherwise occurring lines can thus be reduced to only 616 bits from 8400×2 bits or 1200×2 bits as necessitated when the MR coding format shown in section (B) of FIG. 2 is used. The share of the graphic information signals which occupy the common bus 10 can thus be reduced significantly as compared with the share of the CPU 12 using the common bus 10.

While it has been described that lines are to be skipped over when the lines occur successively in while, a data transfer system according to the present invention may be arranged so that successively occurring black or otherwise colored lines are to be skipped over. In this instance, the runlength code to be used as the bits 62 to indicate the number of the successively occurring black lines may be the black runlength code indicating the length of successively occurring black lines. The coding data 62 in the form of the black runlength code can be expressed in the form of a 25-bit sequence of "1000000110110100000010111", requiring 16+600×1=616 bits for the coding of a total of 1200 lines.

Although, furthermore, a data transfer system according to the present invention has been exemplified by the data transfer system of a facsimile, the gist of the present invention may be implemented in any other form of data transfer systems, in which instance lines scanned may be skipped over when the lines occur successively with a nature common to them.

What is claimed is:

1. A data transfer system wherein a common bus is used comprising first means operative to successively produce pieces of information each consisting of a limited number of data bits, said pieces of information including those having a predetermined nature, second means responsive to said pieces of information produced by said first means and operative to discriminate pieces of information having said predetermined nature from other pieces of information, third means for counting the pieces of information having said predetermined nature when such pieces of information occur successively, and fourth means responsive to encode the successively occurring pieces of information having said predetermined nature into a single piece of information including a code indicating the predetermined nature and a code indicating the number of the successively occurring pieces of information having said predetermined nature.

2. A data transfer system wherein a common bus is used comprising first means operative to successively produce pieces of information each consisting of a limited number of data bits, said pieces of information indicating lines of different colors including a predetermined color, second means responsive to said pieces of information produced by said first means and operative to discriminate pieces of information indicating lines of said predetermined color from other pieces of information, third means for counting the pieces of information indicating lines of said predetermined color when such pieces of information occur successively, and fourth means responsive to encode the successively occurring pieces of information indicating lines of said predetermined color into a single piece of information including a code specifying the predetermined color and a code specifying the number of the successively occurring pieces of information indicating lines of said predetermined color.

3. A data transfer system as set forth in claim 2, wherein said code indicating the number of the pieces of information indicating lines of said predetermined color is expressed in the form of a runlength code.

* * * * *